US012806702B2

(12) United States Patent
Weber

(10) Patent No.: US 12,806,702 B2
(45) Date of Patent: Nov. 24, 2026

(54) METHOD AND DEVICE FOR SMOOTHING TOOTH FLANKS OF THE TEETH OF TOOTHED WORKPIECES, AND TOOL FOR CARRYING OUT THE METHOD

(71) Applicant: Profilator GmbH & Co. KG, Wuppertal (DE)

(72) Inventor: Gerd-Thomas Weber, Wuppertal (DE)

(73) Assignee: Profilator GmbH & Co. KG, Wuppertal (DE)

( * ) Notice: Subject to any disclaimer, the term of this patent is extended or adjusted under 35 U.S.C. 154(b) by 751 days.

(21) Appl. No.: 17/765,761

(22) PCT Filed: Sep. 29, 2020

(86) PCT No.: PCT/EP2020/077191
§ 371 (c)(1),
(2) Date: Mar. 2, 2023

(87) PCT Pub. No.: WO2021/063924
PCT Pub. Date: Apr. 8, 2021

(65) Prior Publication Data
US 2023/0219153 A1 Jul. 13, 2023

(30) Foreign Application Priority Data
Oct. 2, 2019 (DE) ..................... 10 2019 126 669.6

(51) Int. Cl.
*B23F 19/10* (2006.01)
*B23F 21/10* (2006.01)

(52) U.S. Cl.
CPC ............ *B23F 19/101* (2013.01); *B23F 21/10* (2013.01)

(58) Field of Classification Search
CPC ......... B23F 19/00; B23F 19/101; B21H 5/022
See application file for complete search history.

(56) References Cited

U.S. PATENT DOCUMENTS 1,858,044 A * 5/1932 Head ...................... B21H 5/045 29/90.6
1,955,082 A * 4/1934 Miller ..................... B23F 19/02 407/26

(Continued)

FOREIGN PATENT DOCUMENTS

DE 243514 C 2/1912
DE 102017000260 A1 7/2018

(Continued)

OTHER PUBLICATIONS

RU-2332289-C1 translation (Year: 2008).*

(Continued)

*Primary Examiner* — Michael W Hotchkiss
(74) *Attorney, Agent, or Firm* — Whitmyer IP Group LLC

(57) ABSTRACT

The invention relates to a method and a device for finishing toothed workpieces (2) using a tool (1) which is designed in the form of a power skiving cut-ter and is rotated by a tool spindle (17) and which has machining teeth (7) that mesh with tooth gaps (6) of the workpiece (2) in a rolling movement, said workpiece being supported by a workpiece spindle (15), which is arranged in a skewed manner relative to the tool rotational axis (4) and is driven synchronously thereto, such that machining edges (8) of the machining teeth (7) machine the tooth flanks (9) of the teeth (5) of the workpiece (2) in the direction of the tooth flank extension. According to the invention, the tool is used such that the machining edges (8) machine the tooth flanks (9) so as to only grind same without removing chips, wherein for this purpose the rounding radius of the machining edges (8) is greater than the chip thickness or cutting depth (E).

11 Claims, 3 Drawing Sheets

(56) References Cited

U.S. PATENT DOCUMENTS

| | | | | | |
|---|---|---|---|---|---|
| 2,121,479 | A * | 6/1938 | Drummond | B23F 19/04 | 409/38 |
| 2,328,783 | A * | 9/1943 | Christman | B23F 19/066 | 29/90.6 |
| 3,264,940 | A | 8/1966 | Ernest | | |
| 3,713,316 | A * | 1/1973 | Lichtenauer | B21H 5/022 | 29/893.32 |
| 6,151,778 | A * | 11/2000 | Woolf | B22F 5/08 | 29/893.32 |
| 6,517,772 | B1 * | 2/2003 | Woolf | B21H 5/022 | 419/28 |
| 6,779,270 | B2 * | 8/2004 | Sonti | B21H 5/022 | 29/893.3 |
| 8,596,939 | B2 * | 12/2013 | Prock | B23F 19/102 | 409/8 |
| 2006/0264155 | A1 * | 11/2006 | Kobialka | B23F 19/057 | 451/8 |
| 2011/0268524 | A1 * | 11/2011 | Prock | B23F 21/005 | 407/1 |
| 2012/0227530 | A1 * | 9/2012 | Kotthoff | B21H 5/022 | 74/434 |

FOREIGN PATENT DOCUMENTS

| | | | | |
|---|---|---|---|---|
| EP | 0815984 | A1 | 1/1998 | |
| EP | 2474379 | A1 | 7/2012 | |
| EP | 2665574 | B1 | 12/2016 | |
| EP | 2520390 | B1 | 1/2018 | |
| ES | 2394924 | T3 * | 2/2013 | B21H 5/022 |
| JP | S5441253 | A | 4/1979 | |
| JP | S5985338 | A | 5/1984 | |
| RU | 2332289 | C1 * | 8/2008 | |
| RU | 2470731 | C2 * | 12/2012 | |

OTHER PUBLICATIONS

RU-2470731-C2 translation (Year: 2012).*

ES-2394924-T3 translation (Year: 2013).*

Steel Number.com, C45, Jul. 22, 2014, p. 1, https://www.steelnumber.com/en/steel_composition_eu.php?name_id=152 (Year: 2014).*

International Search Report and Written Opinion of the International Seacrhing Authority; Application No. PCT/EP2020/077191; Completed: Nov. 25, 2020; Mailing Date: Dec. 8, 2020; 8 Pages.

* cited by examiner

METHOD AND DEVICE FOR SMOOTHING TOOTH FLANKS OF THE TEETH OF TOOTHED WORKPIECES, AND TOOL FOR CARRYING OUT THE METHOD

TECHNICAL FIELD

The invention relates to a method and a device for finishing toothed workpieces with a tool that is designed in the form of a circular skiving cutter and rotationally driven about a tool rotational axis by a tool spindle, wherein said tool has machining teeth that engage into tooth gaps of the workpiece in a rolling motion, wherein said workpiece is carried by a workpiece spindle that is arranged in a skewed manner relative to the tool rotational axis and rotationally driven synchronous thereto about a workpiece rotational axis, and wherein said device comprises a control, which is programmed in such a way that machining edges of the machining teeth machine the tooth flanks of the teeth of the workpiece in the direction in which the tooth flanks extend.

PRIOR ART

Various types of skiving cutters are known from the prior art. They are known, for example, from DE 2 43 514, EP 2 665 574 B1, U.S. Pat. No. 3,264,940 or EP 2 520 390 B1.

SUMMARY OF THE INVENTION

The invention is based on the objective of reducing the surface roughness of the tooth flanks of the teeth of toothed workpieces.

This objective is attained with the machining method specified in claim 1 and the device for carrying out the method characterized in claim 2. The dependent claims represent advantageous enhancements of the two coordinate claims.

The invention initially and essentially proposes to use a machining tool in the form of a smoothing tool that, except for the machining costs, is otherwise designed in the form of a circular skiving cutter. The machining teeth of the circular skiving cutter engage into the tooth gaps of the already toothed circular workpiece. The penetration depth, i.e. the machining thickness or cutting depth, is adjusted in such a way that the machining edges of the machining teeth of the tool, which in a known circular skiving cutter engage into the tooth flanks of the teeth of the circular workpiece in a cutting manner, merely perform a smoothing function. To this end, it is particularly proposed that the rounding radius of the machining edges of the inventive tool is greater than in a conventional circular skiving cutter. The rounding radius of the machining edges particularly is larger than the penetration depth of the machining edges into the surface of the tooth flank to be machined. The material of the circular workpiece has such a quality that the machining edges have a non-cutting effect. They push sections of the structures that form the roughness and protrude beyond a smoothing plane into adjacent regions that lie below the smoothing plane. The plane, along which the machining edges move, therefore lies between a first plane that extends through the peaks of the structures forming the roughness and a second plane that extends through the valleys between the structures forming the roughness. In this context, the rounding radius preferably is larger than the distance between the smoothing plane and the first plane extending through the peak contours. A center of the rounding therefore preferably lies outside the volume extending between the first plane and the second plane. The inventive method is particularly suitable for smoothing the surfaces of a workpiece that is made of a tempering steel or a nitriding steel. The tensile strength of the material of the workpieces preferably lies below 1350 N/mm$^2$. The method is suitable for use on internal toothings or external toothings. The teeth of the machining tool may be formed by an internal toothing or an external toothing. The rounding radius of the machining edges preferably amounts to at least 50 micrometer. However, the rounding radius may also amount to at least 100 micrometer or at least 150 micrometer.

BRIEF DESCRIPTION OF THE DRAWINGS

The invention is described in greater detail below with reference to the attached drawings. In these drawings.

DESCRIPTION OF THE EMBODIMENTS

Figure 4:
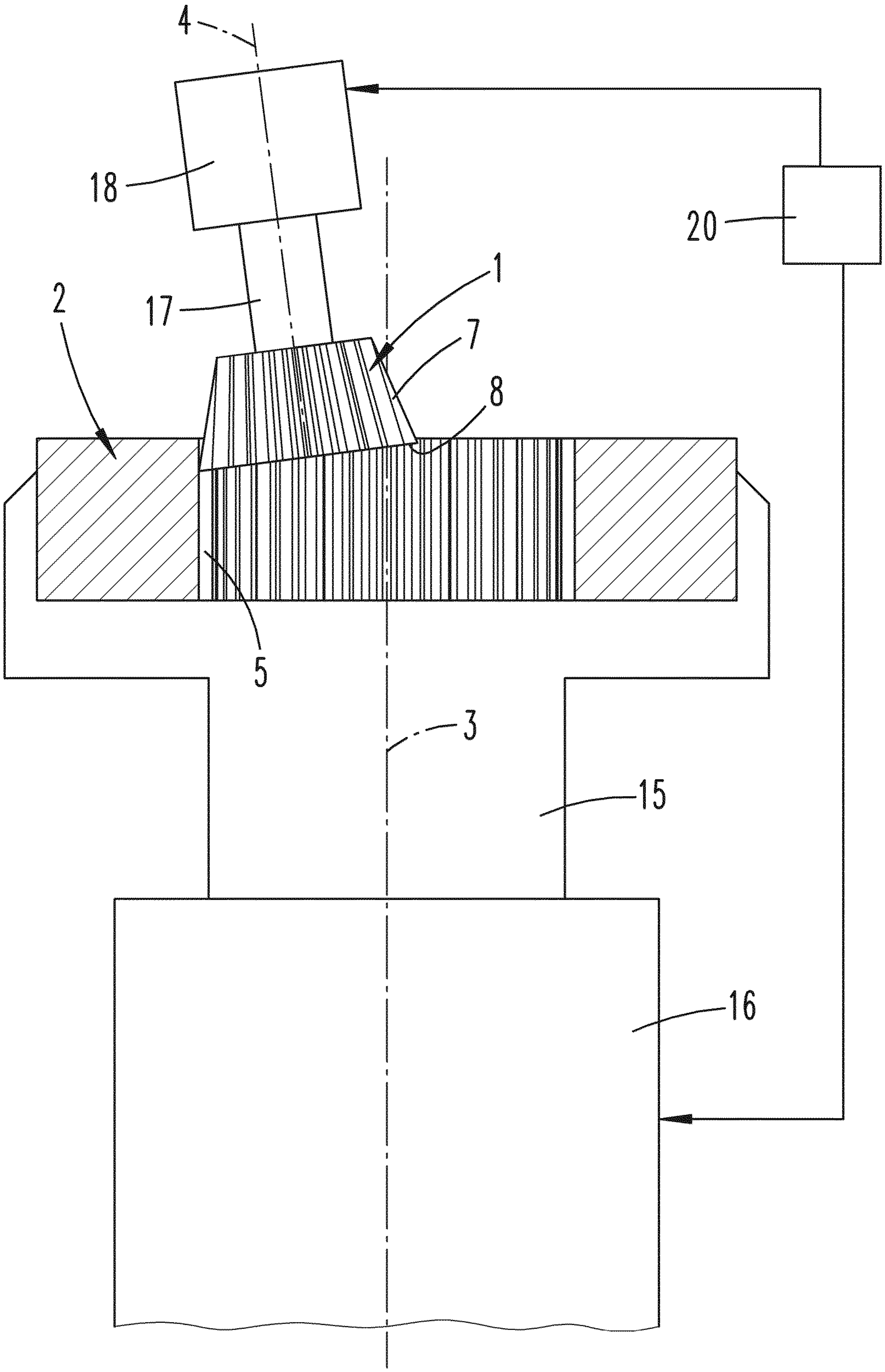

FIG. 4 schematically shows a device for finishing circular workpieces 2. In the exemplary embodiment according to FIG. 4, the circular workpiece 2 has an internal toothing with teeth 5 that respectively have tooth flanks 9. The toothing was produced in a preceding machining process, e.g. by means of skiving. The tooth flanks 9 may be coarsely toothed. However, it is also possible that the surfaces of the tooth flanks 9 were already smoothed.

The inventive device illustrated in FIG. 4 may be a special device that is exclusively intended for finishing previously toothed circular workpieces 2. However, it is also proposed that the device not only has the tool spindle 18 with a smoothing tool 1 illustrated in FIG. 4. The device may also have a second tool, e.g. for producing the toothing. This not-shown gear cutting tool makes it possible to produce the toothing of the circular workpiece 2 by means of skiving. During such a skiving process, the axis 3 of the circular workpiece 2 and the axis 4 of the tool 1 are arranged relative to one another in a skewed manner such that cutting edges of cutting teeth of the circular skiving cutter cut the tooth gaps between the teeth in the form of a screwing-rolling motion. This takes place with a feed motion in the direction in which the tooth flanks extend. The toothings of the circular workpiece and the circular skiving cutter engage into one another in the form of a screwing motion.

The above-described skiving cutter for producing the toothing of the circular workpiece 2 has cutting edges with a small rounding radius whereas the tool 1 in the form of a circular skiving cutter illustrated in FIG. 4 has machining teeth 7, the machining edges 8 of which have a rounding radius with a greater value.

Figure 1:
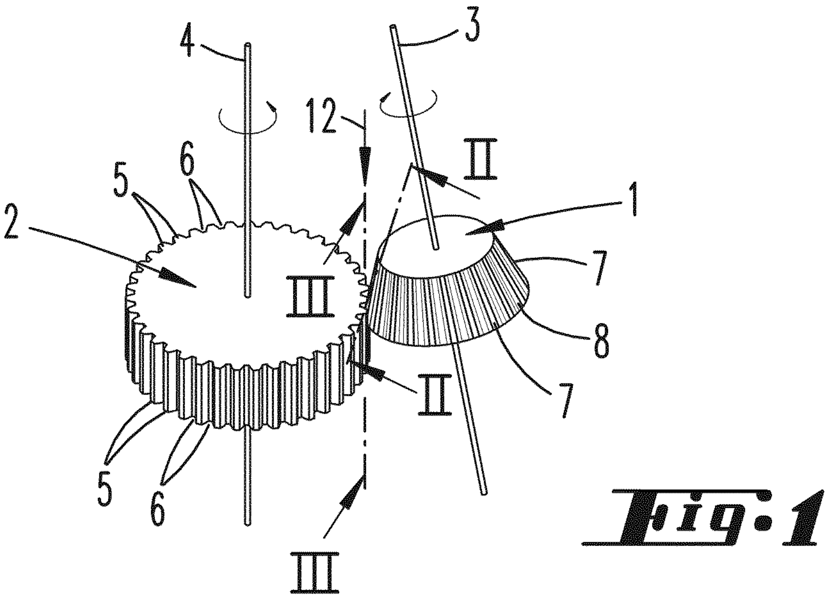
FIG. 1 schematically shows the spatial arrangement of a tool 1 being rotationally driven about a tool axis 3 relative to a workpiece 2 being rotationally driven about a workpiece axis 4.
Figure 2:
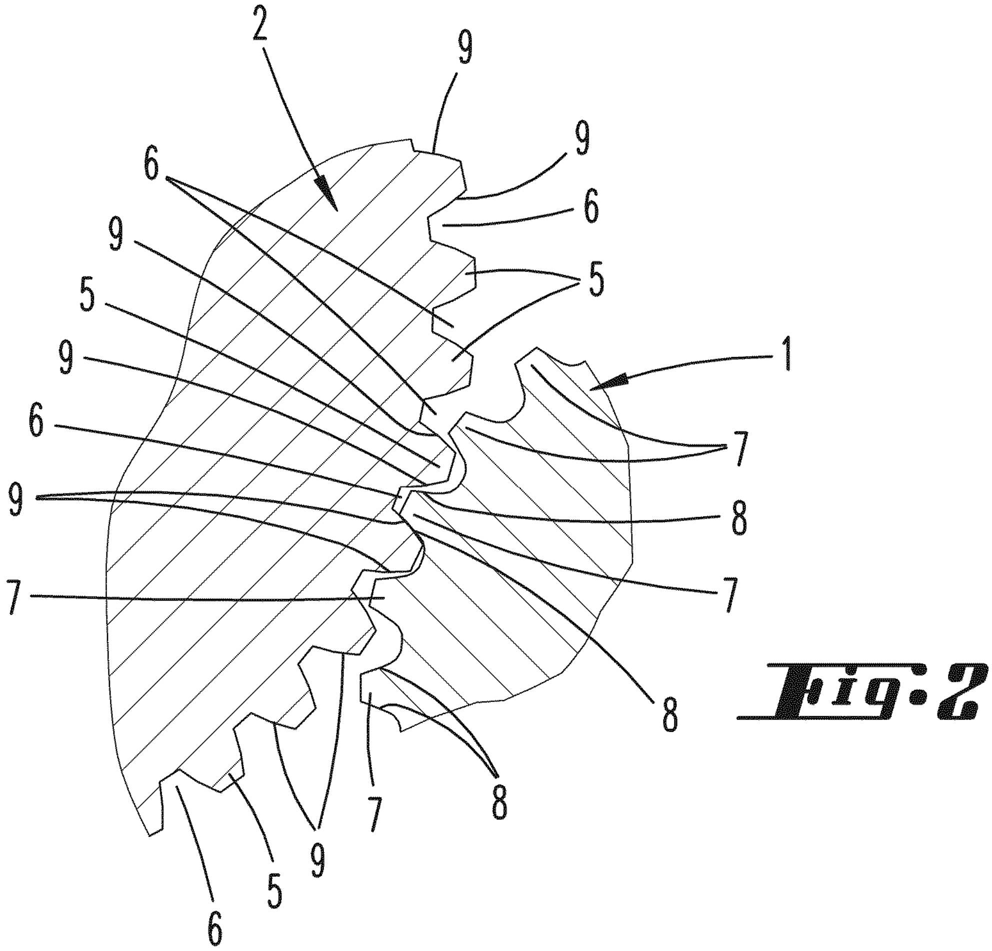
FIG. 2 shows an enlarged section through the engagement of the machining teeth 7 into tooth gaps 6 of the toothing of the circular workpiece 2 along the line of section II-II in FIG. 1.

FIGS. 1 and 2 elucidate the kinematics of the skiving motion used for the above-described gear cutting process, as well as for finishing the tooth flanks 9 in accordance with the invention. FIG. 1 shows the spatial position of the tool 1 and the circular workpiece 2 relative to one another in the form of a perspective view. FIG. 2 shows a section through the engagement of the cutting teeth or machining teeth 7 into the tooth gaps 6 between the teeth 5 of the toothing of the circular workpiece 2. In this case, the machining edges 8 machine the tooth flanks 9 of the teeth 5 in that they roll on the tooth flanks 9 in the circumferential direction of the circular workpiece 2 or the tool 1. Due to the angle of inclination between the two rotational axes 3, 4, the machining edges 8 additionally move in a feed direction that extends in the direction in which the teeth extend and is identified by the reference symbol 12 in FIGS. 1 and 3.

Figure 3:
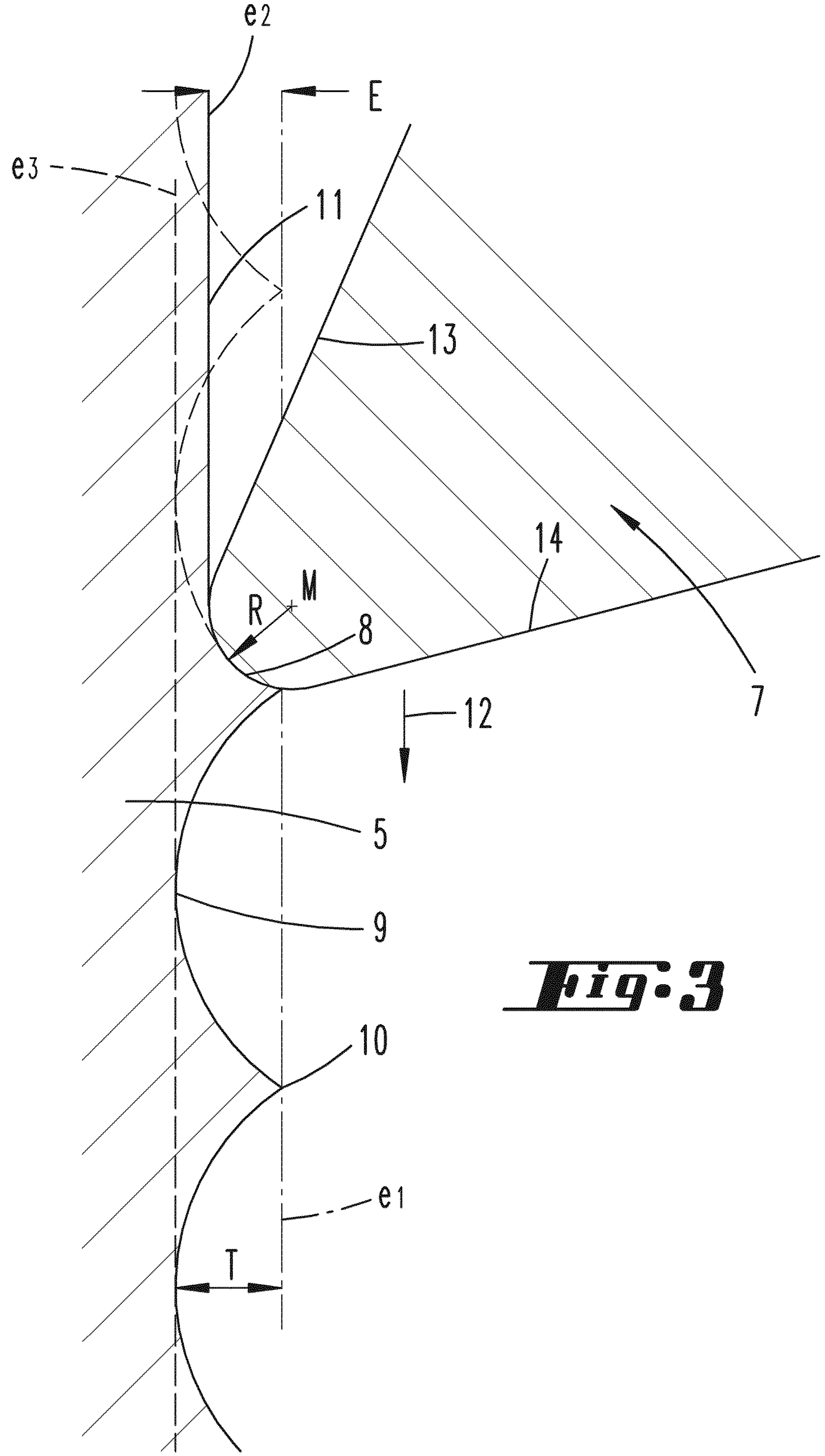
FIG. 3 shows a section through the engagement of a machining tooth 7 into the surface of a tooth flank 9 of a tooth 5 along the line of section III-III in FIG. 1, and FIG. 4 schematically shows the essential part of an inventive device with a workpiece spindle 17 carrying a tool 1 and a workpiece spindle 15 carrying a circular workpiece 2.

FIG. 3 schematically shows the function of the inventive method. The coarsely machined or already finished tooth flank 9 of the tooth 5 has a roughness with a peak-to-valley height T. The roughness of the tooth flank 9 is indicated with the structures 10 in FIG. 3. These structures may be marks from the preceding machining process. The machining tooth 7 of the tool 1 has a machining edge 8, which in the cross section according to FIG. 3 extends on a circular arc line from a cutting face 14 to an end flank 13. The machining edge 8 therefore has an edge rounding with a radius R around a center.

The two rotational axes 3, 4 are spaced apart by such a distance that the machining edge 8 merely comes in contact with the tooth flanks 9, but does not penetrate into the tooth flanks 9 in a cutting manner, during the relative screwing motion between the tool 1 and the circular workpiece 2. It is particularly proposed that the machining edges do not penetrate as far as into the deepest regions of the structures 10 of the tooth flanks 9, i.e. not up to the deepest surface sections of the roughing.

However, the machining edges 8 penetrate deeper into the surface e1, which lies parallel to the tooth flank surface and is formed by the peaks of the structures 10, in order to smooth the peaks 10 of the rough tooth flanks 9 during the finishing process, in which their material is pressed into the adjacent valleys between the peaks 10.

In FIG. 3, a plane extending through the highest peaks 10 of the tooth flank 9 is identified by the reference symbol e1. The reference symbol e3 identifies a plane extending through the lowest regions of the tooth flanks 9 such that the peak-to-valley height T is defined by the distance between the two planes e1 and e3. In order to carry out the inventive finishing process, the device is adjusted in such a way that the rounded machining edge 8 moves along a plane e2 that lies between the plane e1 and the plane e3, i.e. through the region of the structures 10 forming the roughness. The distance E between the first plane e1 and the second plane e2 can be respectively referred to as machining depth or penetration depth. According to the invention, this depth is smaller than the rounding radius R of the machining edge 8. As a result of these dimensions, the machining edge 8 does not act in a cutting manner, but rather in a non-cutting manner in that it pushes the material of the sections of the tooth flanks 9, which protrude beyond the second plane e2, in front of itself and as far as into the valley lying between two peaks 10.

The cutting edges of skiving cutters have a rounding radius of less than 20 micrometer whereas the rounding radius of the machining edges 8 has values greater than 20 micrometer. In preferred methods and devices, the rounding radius of the machining edges 8 amounts to at least 50 micrometer or at least 100 micrometer or at least 150 micrometer.

The preceding explanations serve for elucidating all inventions that are included in this application and respectively enhance the prior art independently with at least the following combinations of characteristics, wherein two, multiple or all of these combinations of characteristics may also be combined with one another, namely:

A method, which is characterized in that the machining edges (8) act upon the tooth flanks (9) in a smoothing manner without metal removal.

A device, which is characterized in that the control unit (20) is programmed in such a way, the rotational axes (3, 4) are spaced apart from one another in such a way and the machining teeth (7) are designed in such a way that the machining teeth (7) act upon the tooth flanks (9) in a smoothing manner without metal removal.

A method or a device, which are characterized in that the rounding radius (R) of the machining edges (8) is greater than the machining thickness or cutting depth (E).

A method or a device, which are characterized in that the workpiece (2) consists of a tempering steel or nitriding steel.

A method or a device, which are characterized in that the tensile strength of the material of the workpiece (2) amounts to no more than 1350 $N/mm^2$.

A method or a device, which are characterized in that the workpiece (2) has an internal toothing or an external toothing, the tooth flanks (9) of which are smoothed by the machining edges (8).

A method or a device, which are characterized in that the machining teeth (7) are formed by an internal toothing or an external toothing.

A tool for carrying out the method, which is characterized in that the rounding radius R of the at least one machining edge 8 is greater than 50 micrometer.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Tool
2 Circular workpiece
3 Tool axis
4 Workpiece axis
5 Tooth
6 Tooth gap
7 Machining tooth
8 Machining edge
9 Tooth flank
10 Structure

11 Smoothed tooth flank
12 Axial feed component
13 End flank
14 Cutting face
15 Workpiece spindle
16 Driving motor
17 Tool spindle
18 Driving motor
20 Control
E Machining depth
G Smoothing depth
R Peak-to-valley height
R Rounding radius
e1 Plane
e2 Plane
e3 Plane

The invention claimed is:

1. A method for finishing a workpiece with a tool that is designed in the form of a circular skiving cutter and rotationally driven by a tool spindle, wherein the workpiece comprises teeth, wherein the teeth comprise tooth flanks, wherein said tool has machining teeth that engage into tooth gaps of the workpiece in a rolling motion, and wherein said workpiece is carried by a workpiece spindle that is arranged in a skewed manner relative to a tool rotational axis and driven synchronous thereto such that machining edges of the machining teeth machine the tooth flanks of the teeth of the workpiece in a direction in which the tooth flanks extend, wherein the machining edges act upon the tooth flanks in a smoothing manner without metal removal, wherein the machining edges comprise a rounding radius, wherein the rounding radius of the machining edges is greater than a machining thickness or a cutting depth of the machining edges into the tooth flank to be machined, and wherein the machining edges extend from a cutting face to an end flank in a cross-section.

2. The method according to claim 1, wherein the workpiece has an internal toothing or an external toothing, the tooth flanks of which are smoothed by the machining edges.

3. The method according to claim 1, wherein the machining teeth are formed by an internal toothing or an external toothing.

4. The method according to claim 1, wherein the workpiece consists of a tempering steel or nitriding steel.

5. The method according to claim 4, wherein the workpiece is made of a material, wherein a tensile strength of the material of the workpiece amounts to no more than 1350 N/mm2.

6. A device for finishing a workpiece with a tool that is designed in the form of a circular skiving cutter and rotationally driven about a tool rotational axis by a tool spindle, wherein the workpiece comprises teeth, wherein the teeth comprise tooth flanks, wherein said tool has machining teeth that engage into tooth gaps of the workpiece in a rolling motion, wherein said workpiece is carried by a workpiece spindle that is arranged in a skewed manner relative to the tool rotational axis and rotationally driven synchronous thereto about a workpiece rotational axis, and wherein said device comprises a control, which is programmed in such a way that machining edges of the machining teeth machine the tooth flanks of the teeth of the workpiece in a direction in which the tooth flanks extend, wherein a control unit is programmed in such a way, the tool rotational axis and the workpiece rotational axis are spaced apart from one another in such a way and the machining teeth are designed in such a way that the machining edges of machining teeth act upon the tooth flanks in a smoothing manner without metal removal, wherein the machining edges comprise a rounding radius, wherein the rounding radius of the machining edges is greater than a machining thickness or a cutting depth of the machining edges into the tooth flank to be machined, and wherein the machining edges extend from a cutting face to an end flank in a cross-section.

7. The device according to claim 6, wherein the workpiece has an internal toothing or an external toothing, the tooth flanks of which are smoothed by the machining edges.

8. The device according to claim 6, wherein the machining teeth are formed by an internal toothing or an external toothing.

9. The device according to claim 6, wherein the workpiece consists of a tempering steel or nitriding steel.

10. The device according to claim 9, wherein the workpiece is made of a material, wherein a tensile strength of the material of the workpiece amounts to no more than 1350 N/mm2.

11. A tool for carrying out a method for finishing a workpiece, wherein the workpiece comprises teeth, wherein the teeth comprise tooth flanks, the tool being designed in the form of a circular skiving cutter and rotationally driven by a tool spindle, wherein said tool has machining teeth that engage into tooth gaps of the workpiece in a rolling motion, and wherein said workpiece is carried by a workpiece spindle that is arranged in a skewed manner relative to the tool rotational axis and driven synchronous thereto such that machining edges of the machining teeth machine the tooth flanks of the teeth of the workpiece in a direction in which the tooth flanks extend, wherein the machining edges act upon the tooth flanks in a smoothing manner without metal removal, wherein said tool is rotationally driven about a tool rotational axis, comprises machining teeth with a machining edge having an edge rounding and is designed in the form of a circular skiving cutter, wherein the rounding radius of the machining edges is greater than a machining thickness or a cutting depth of the machining edges into the tooth flank to be machined, wherein the rounding radius of the machining edge is greater than 50 micrometer, and wherein the machining edges extend from a cutting face to an end flank in a cross-section.

* * * * *